(12) United States Patent
Otani

(10) Patent No.: US 7,793,694 B2
(45) Date of Patent: Sep. 14, 2010

(54) SAFETY TIRE AND HOLLOW RING BODY

(75) Inventor: Koji Otani, Nasushiobara (JP)

(73) Assignee: Bridgestone Corporation, Tokyo (JP)

( * ) Notice: Subject to any disclaimer, the term of this patent is extended or adjusted under 35 U.S.C. 154(b) by 100 days.

(21) Appl. No.: 11/908,466

(22) PCT Filed: Mar. 13, 2006

(86) PCT No.: PCT/JP2006/304916
§ 371 (c)(1),
(2), (4) Date: Sep. 12, 2007

(87) PCT Pub. No.: WO2006/098280
PCT Pub. Date: Sep. 21, 2006

(65) Prior Publication Data
US 2009/0051213 A1 Feb. 26, 2009

(30) Foreign Application Priority Data
Mar. 14, 2005 (JP) ............................... 2005-070767

(51) Int. Cl.
*B60C 5/00* (2006.01)
*B60C 17/00* (2006.01)
(52) U.S. Cl. ...................... 152/516; 152/450; 152/510; 152/511; 152/520; 152/521
(58) Field of Classification Search .................. 152/516, 152/520, 521, 510, 511, 450
See application file for complete search history.

(56) References Cited

U.S. PATENT DOCUMENTS 4,987,937 A * 1/1991 Nowicke .................... 152/400
5,891,278 A * 4/1999 Rivin ......................... 152/418

FOREIGN PATENT DOCUMENTS

| CN | 2389799 Y | 8/2000 |
|---|---|---|
| DE | 4325470 | 2/1995 |
| DE | 10232066 | 2/2004 |
| EP | 0407126 | 1/1991 |
| FR | 2151663 * | 4/1973 |

(Continued)

OTHER PUBLICATIONS

Machine translation of JP 2003-118312, Apr. 23, 2003.*

(Continued)

*Primary Examiner*—Justin Fischer
(74) *Attorney, Agent, or Firm*—Sughrue Mion, PLLC

(57) ABSTRACT

It is to solve problems in a safety tire in which hollow particles also referred to as the foamable compositions are filled in the hollow ring-shaped partition wall and to provide a safety tire having a partition wall structure capable of sufficiently developing the function of the hollow particles.

In a safety tire comprising a tire/approved rim assembly constructed by assembling the tire onto the approved rim, a hollow ring-shaped partition wall disposed inside the assembly to define a chamber extending in a circumferential direction along the rim, and thermally expandable hollow particles filled in the chamber and each consisting of a continuous phase of a resin and a closed cell(s), wherein the partition wall is provided with a filter selectively passing only a gas emitted when the hollow particles are thermally expanded.

13 Claims, 10 Drawing Sheets

FOREIGN PATENT DOCUMENTS

| | | | |
|---|---|---|---|
| GB | 2007168 | * | 5/1979 |
| JP | 4-118012 | * | 4/1992 |
| JP | 05038907 | * | 2/1993 |
| JP | 07290914 | * | 11/1995 |
| JP | 10-176812 | * | 6/1998 |
| JP | 2002-87028 A | | 3/2002 |
| JP | 2003118312 | | 4/2003 |
| JP | 2004-75039 A | | 3/2004 |
| WO | 2004050392 | | 6/2004 |

OTHER PUBLICATIONS

European Search Report dated Mar. 31, 2009.

* cited by examiner (a)

(b)

(a)

(b)

(c)

(a)

(b)

(c)

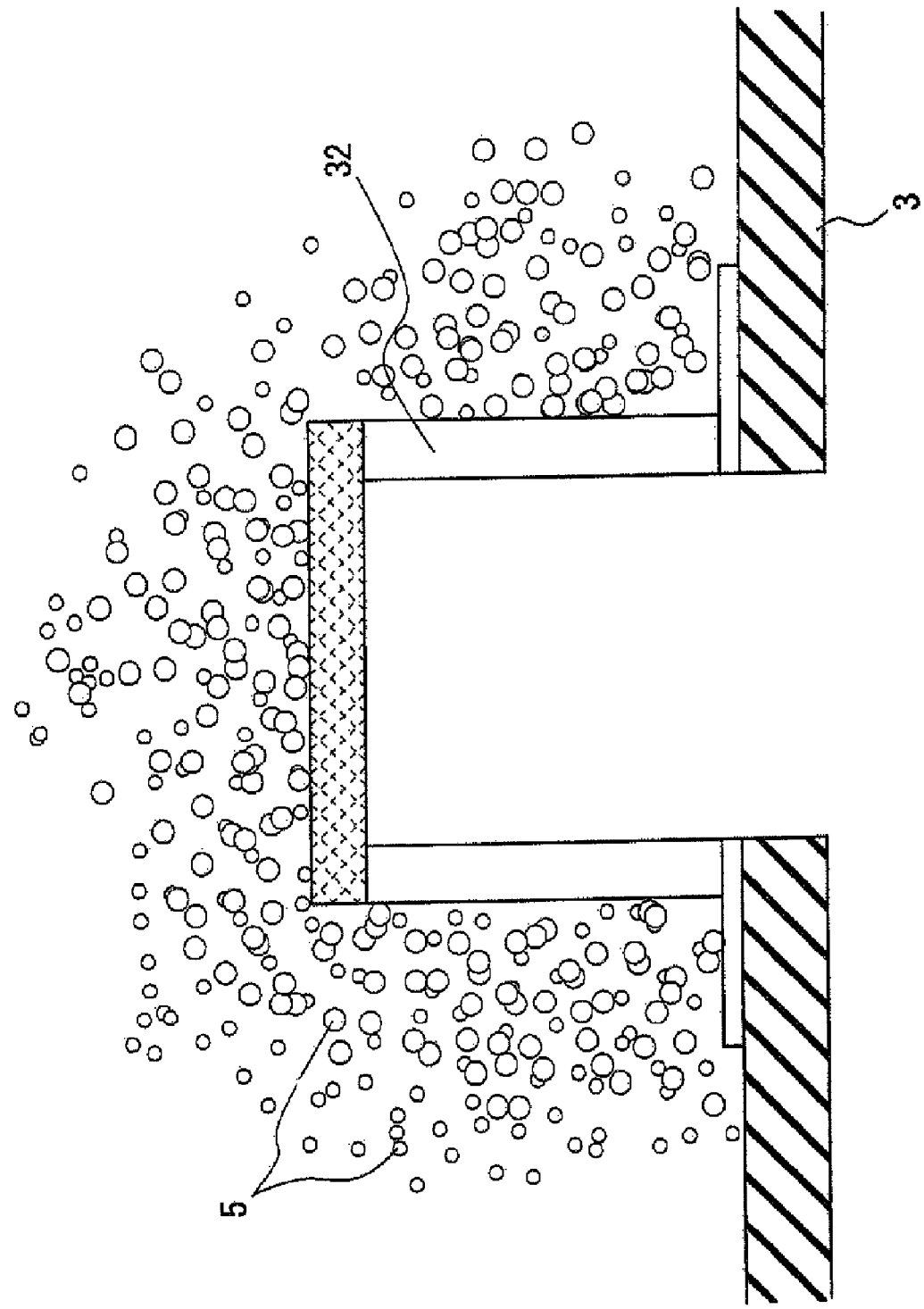

SAFETY TIRE AND HOLLOW RING BODY

TECHNICAL FIELD

The present invention relates to a safety tire capable of continuing safety traveling over a required distance even at a puncture state after the tire is subjected to an external injury or the like as well as a hollow ring body used in this safety tire.

RELATED ART

There have been made various proposals on the safety tire capable of continuing safety traveling over a required distance at a puncture state of the tire.

For example, Patent Document 1 discloses a technique wherein a tire is assembled onto an approved rim, and a chamber extending in a circumferential direction along the rim is defined inside the tire/approved rim assembly through a hollow ring-shaped partition wall, and a foamable composition is filled in the chamber, and the partition wall is enlarged by the expansion of the foamable composition at the time of the injury of the tire, and hence a tire internal pressure can be restored by the enlarged partition wall.

Patent Document 1: JP-A-2004-75039

DISCLOSURE OF THE INVENTION

Problems to be Solved by the Invention

However, when the partition wall is enlarged by the expansion of the formable composition, there are residual problems that it is difficult to control the expansion and it is required to fill a large amount of the foamable composition in the partition wall so as to fill the volume of the inside of the tire/rim assembly with the foamable composition, which leads to increase the weight and cost.

It is, therefore, an object of the present invention to solve the above-mentioned problems in a safety tire in which hollow particles also referred to as the foamable compositions are filled in the hollow ring-shaped partition wall and to provide a safety tire having a partition wall structure capable of sufficiently developing the function of the hollow particles.

Means for Solving Problems

That is, the summary of the present invention is as follows.

(1) A safety tire comprising a tire/approved rim assembly constructed by assembling the tire onto the approved rim, a hollow ring-shaped partition wall disposed inside the assembly to define a chamber extending in a circumferential direction along the rim, and thermally expandable hollow particles filled in the chamber and each consisting of a continuous phase of a resin and a closed cell(s), characterized in that the partition wall is provided with a filter selectively passing only a gas emitted when the hollow particles are thermally expanded.

(2) A safety tire according to the item (1), wherein the partition wall is made from a urethane resin.

(3) A safety tire according to the item (1) or (2), wherein the filter is a heat-resistant filter made from at least one of glass fibers, alumina-based ceramic fibers, polyester fibers and nylon fibers.

(4) A hollow ring body used inside a tire/approved rim assembly constructed by assembling the tire onto the approved rim, which comprises a filter selectively passing only a gas.

(5) A hollow ring body used inside a tire/approved rim assembly constructed by assembling the tire onto the approved rim, characterized in that the hollow ring body is filled with thermally expandable hollow particles each consisting of a continuous phase of a resin and a closed cell(s) and is provided with a filter selectively passing only a gas emitted when the hollow particles are thermally expanded.

(6) A hollow ring body according to the item (4) or (5), wherein the filter is attached to the hollow ring body through a stiff structure.

(7) A hollow ring body according to the item (4) or (5), wherein the filter is attached to the hollow ring body through a flexible structure.

(8) A hollow ring body according to the item (4) or (5), wherein the filter is attached to the hollow ring body through a tubular member extending in an inside of the hollow ring body.

EFFECT OF THE INVENTION

According to the present invention, an internal pressure of the tire once reduced or lost is restored by the action of the hollow particles, so that a tire internal pressure enough to support a vehicle weight can be obtained again. Therefore, even in a tire fallen into a puncture state, tension is applied to a skeleton section of the tire, and hence secure traveling can be continued even after the tire is injured.

Figure 1:
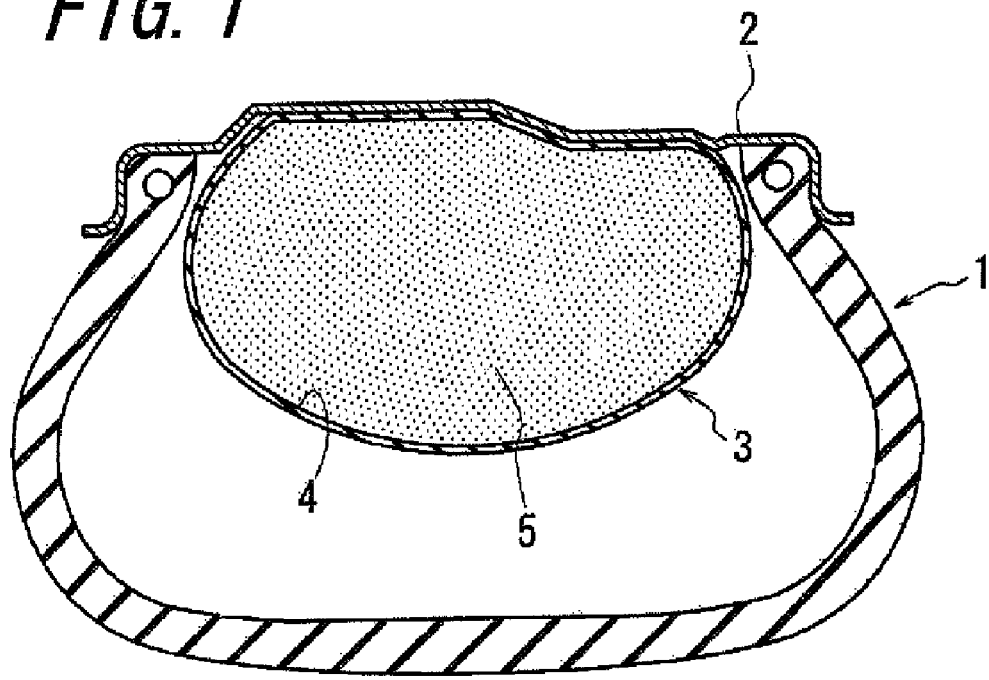
FIG. 1 is a widthwise section view of the safety tire according to the present invention.

DESCRIPTION OF REFERENCE SYMBOLS 1 tire
2 rim
3 partition wall
4 chamber
5 hollow particle
6 filter
7 foreign matter
8 injured hole

BEST MODE FOR CARRYING OUT THE INVENTION

The safety tire according to the present invention will be described with reference to FIG. 1 showing a section in its widthwise direction below.

Figure 2:
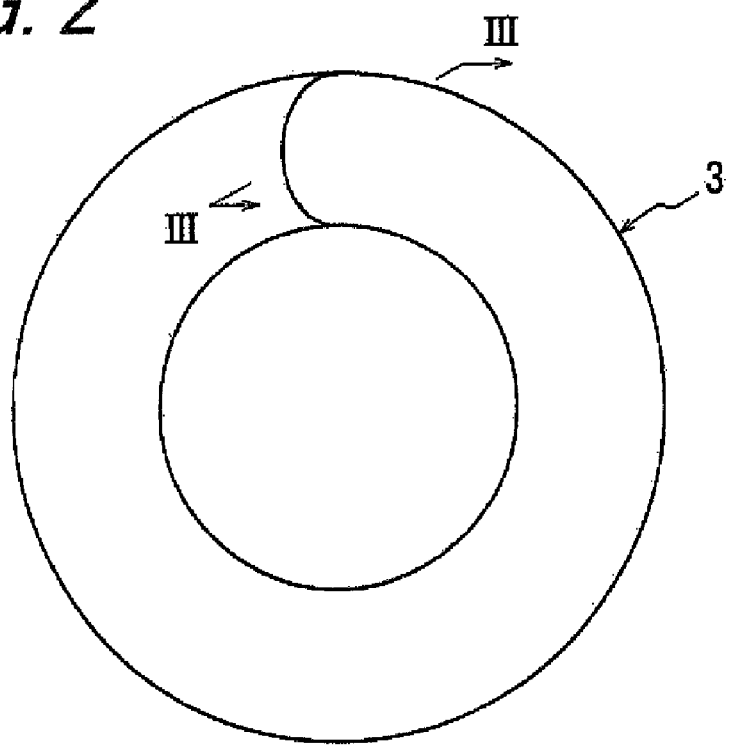
FIG. 2 is a view showing a hollow ring-shaped partition wall used in the safety tire according to the present invention.

That is, the safety tire shown in FIG. 1 is constructed by assembling a tire 1 onto a rim 2, defining a chamber 4 extending in the circumferential direction along the rim 2 through a hollow ring-shaped partition wall 3 shown in FIG. 2 in an interior of the tire 1 defined by the tire 1 and the rim 2 and filling thermally expandable hollow particles 5 each consisting of a continuous phase of a resin and a closed cell(s) in the chamber 4. Moreover, the structure of the tire 1 is not particularly limited as long as it is generally followed to the structure of various automotive tires such as a passenger car tire and the like. For example, the illustrated tire is a common tire for passenger cars, in which a belt and a tread are arranged on a crown portion of a carcass toroidally extending between a pair of bead cores outward in a radial direction in this order.

The partition wall 3 is arranged so as not to contact with an inner surface of the tire 1 by arranging along a rim base of the rim 2. In such an arrangement, even if a large input is applied to the tire, since the partition wall 3 itself is flexible in addition to the above arrangement, it is not subjected to a large impact and does not obstruct the ride comfort in the normal use. Moreover, a gas such as nitrogen, air or the like is filled in an outside of the chamber 4 defined by the partition wall 3 to give an internal pressure to the tire.

The partition wall 3 is preferable to be made from, for example, a urethane resin or rubber. That is, as the partition wall 3 is suitable a material ensuring a large elongation and having an excellent resistance to creep due to centrifugal force during the traveling, and the urethane resin, especially polyurethane is preferable.

Figure 3:
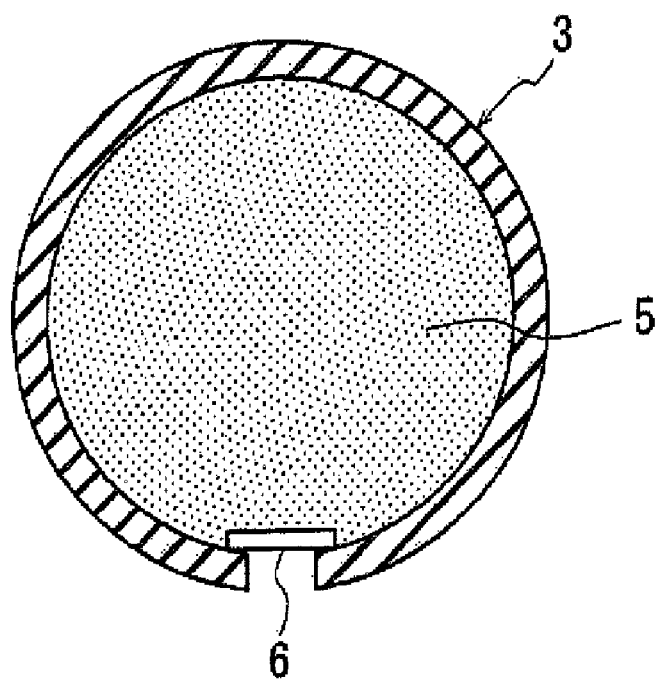
FIG. 3 is a view showing a filter disposed in the partition wall.
Figure 3:
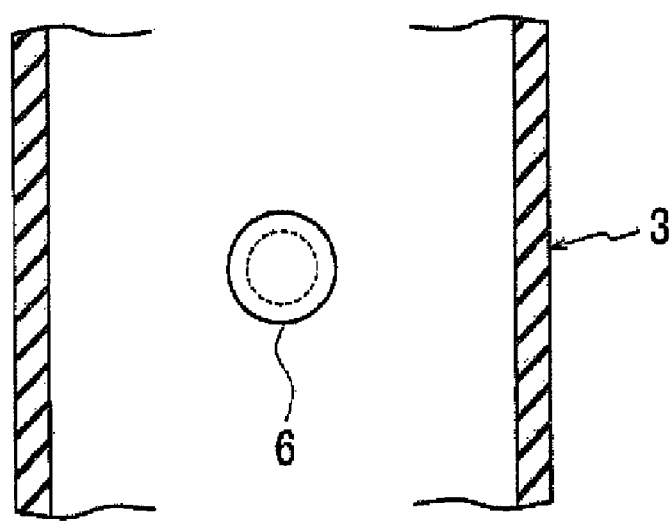

In the partition wall 3, it is important that a filter 6 selectively passing only a gas emitted when the hollow particles 5 are thermally expanded is disposed in at least one place on an outer peripheral portion of the hollow ring-shaped partition wall as shown in FIG. 3. Also, it is possible to dispose the filter 6 in 4 to 6 places dividing equally the outer periphery. By disposing the plural filters is smoothly conducted the pass of the gas, and hence it is possible to quickly restore a height of the tire. However, the mechanical strength of the hollow ring-shaped partition wall lowers accompanied with the increase of the filter number, so that it can be said that the excessive increase of the filter number is inadvisable.

The hollow particle 5 is a hollow body having a closed cell(s) surrounded by substantially a sphere-shaped continuous phase of a resin and a particle size distribution with an average particle size of about 20 μm-500 μm, or a sponge structural body containing a great number of small chambers made of closed cells. That is, the hollow particle 5 is a particle involving a closed cell(s) not communicated with an exterior, and the number of the closed cells may be one or more. In this context, "the interiors of the closed cells in the hollow particle group" collectively means "a hollow part". Also, the feature that the hollow particle involves the closed cell(s) means that the particle has "a shell made of a resin" for involving the closed cell(s) at a closed state. Furthermore, the continuous phase of the resin means "a continuous phase of a composition constituting the shell made of the resin". Moreover, the composition of the shell made of the resin will be mentioned later.

The hollow particles are obtained by heat-expanding "expandable resin particles" as a starting material, i.e. particles in which gas component is sealed with the resin as a foaming agent of a liquid state. In the expandable resin particle is existent an expansion starting temperature Ts1. In addition, when the hollow particles obtained by the heat-expansion are reheated from room temperature, the hollow particles start further expanding, so that a re-expansion starting temperature Ts2 is existent in the hollow particles. The inventors have made various examinations on the production of the hollow particles from a number of expandable resin particles and used Ts1 as an indication of expansion characteristics until now, but found out that it is more suitable to use Ts2 as an indication of expansion characteristics in the hollow particles.

At first, the expansion behavior is observed when the expandable resin particles are subjected to a heat expansion. Since the expandable resin particle is in the stage before the expansion, the particle diameter is extremely small as compared with that of the hollow particle and the thickness of the shell made of the resin is extremely large. Thus, the expandable resin particle is at a state of a high stiffness as a microcapsule. Therefore, even if the continuous phase as a shell part made of the resin exceeds a glass transition point in the course of the heat expansion, until the shell part becomes flexible to an extent by further heating, an expansive force of the gas inside the shell part cannot overcome the stiffness of the shell part. As a result, Ts1 actually shows a value higher than the glass transition point of the shell part.

On the other hand, when the hollow particles are again subjected to a heat expansion, the thickness of the shell part in the hollow particle is extremely small and the stiffness as a hollow body is at a low state. Therefore, at the same time as the continuous phase as the shell part exceeds the glass transition point, the expansion starts, so that Ts2 is to be lower than Ts1.

In the present invention are utilized the further expansion characteristics of the once expanded hollow particles.

That is, Ts2 of the hollow particles is preferable to be not lower than 90° C. but not higher than 200° C. When Ts2 of the hollow particle is less than 90° C., there is a possibility that the hollow particles are expanded under a temperature environment inside the tire chamber during normal traveling.

While, when Ts2 exceeds 200° C., even if rapid temperature rise resulted from heat generation due to friction of the hollow particles occurs in the run flat traveling after the puncture, the temperature may not reach Ts2, and hence "an internal pressure restoring function" to be aimed may not be sufficiently developed.

Therefore, Ts2 is within a range between 90° C. and 200° C., preferably not lower than 110° C., more preferably not lower than 130° C., and most preferably not lower than 160° C.

As mentioned above, by arranging the hollow particles having the expansion starting temperature Ts2 according to the above upper and lower limits, the internal pressure restoring function is surely developed, while "maintenance of the internal pressure restoring function" in normal traveling is achieved.

As the gas constituting the hollow part (closed cell) of the hollow particle is mentioned at least one gas selected from the group consisting of nitrogen, air, straight and branched aliphatic hydrocarbons having a carbon number of 2 to 8 and fluorides thereof, an alicyclic hydrocarbon having a carbon number of 2 to 8 and a fluoride thereof, and an ether compound represented by the following general formula (III):

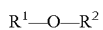    (III)

(wherein $R^1$ and $R^2$ are independently a monovalent hydrocarbon group having a carbon number of 1 to 5, provided that a part of hydrogen atoms in the hydrocarbon group may be substituted with fluorine atom). In addition, the gas to be filled in the tire chamber may be air, but if the gas in the above-mentioned particle is not a fluoride, a gas containing no oxygen such as nitrogen, inert gas or the like is preferable from viewpoint of a safety.

Moreover, a method of producing the hollow particles having a closed cell(s) is not particularly limited, but there is generally a method wherein "expandable resin particles" are prepared by using a foaming agent and then subjected to the heat expansion. As the foaming agent may be mentioned a means for utilizing a vapor pressure such as a high-pressure compressed gas, a liquefied gas or the like, a means for utilizing a heat-decomposable foaming agent which produces a gas through heat decomposition, and so on.

A large number of the heat-decomposable foaming agents have a characteristic of producing nitrogen, so that particles formed by properly controlling the reaction of the expandable resin particles obtained by foaming such a foaming agent mainly contain nitrogen in their cells. The heat-decomposable foaming agent is not particularly limited, and may preferably include dinitrosopentamethylene tetramine, azodicarbon amide, paratoluene sulfonyl hydrazine and derivatives thereof and oxybisbenzene sulfonyl hydrazine.

Next, a method of obtaining "the expandable resin particles" for the hollow particles by utilizing the vapor pressure such as high-pressure compressed gas, liquefied gas or the like will be described.

In case of forming the continuous phase of the resin constituting the hollow particle, there is a method wherein at least one selected from the group consisting of nitrogen, air, straight and branched aliphatic hydrocarbons having a carbon number of 2 to 8 and fluorides thereof, an alicyclic hydrocarbon having a carbon number of 2 to 8 and a fluoride thereof, and an ether compound represented by the following general formula (III):

$$R^1\text{—O—}R^2 \quad (III)$$

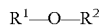

(wherein $R^1$ and $R^2$ are independently a monovalent hydrocarbon group having a carbon number of 1 to 5, proved that a part of hydrogen atoms in the hydrocarbon group may be substituted with fluorine atom) is liquefied as a foaming agent under a high pressure and emulsion-polymerized while dispersing into a reaction solvent. As a result, there can be obtained "expandable resin particles" in which the above-mentioned gas component is sealed as a foaming agent of a liquid state in the above resin continuous phase, which can be heat-expanded to obtain the desired hollow particles.

Also, the objective hollow particles can be obtained by coating the surfaces of "the expandable resin particles" with an anti-blocking agent such as a silica particle or the like, carbon black fine powder, an antistatic agent, a surfactant or the like and then subjecting to the heat expansion.

Figure 4:
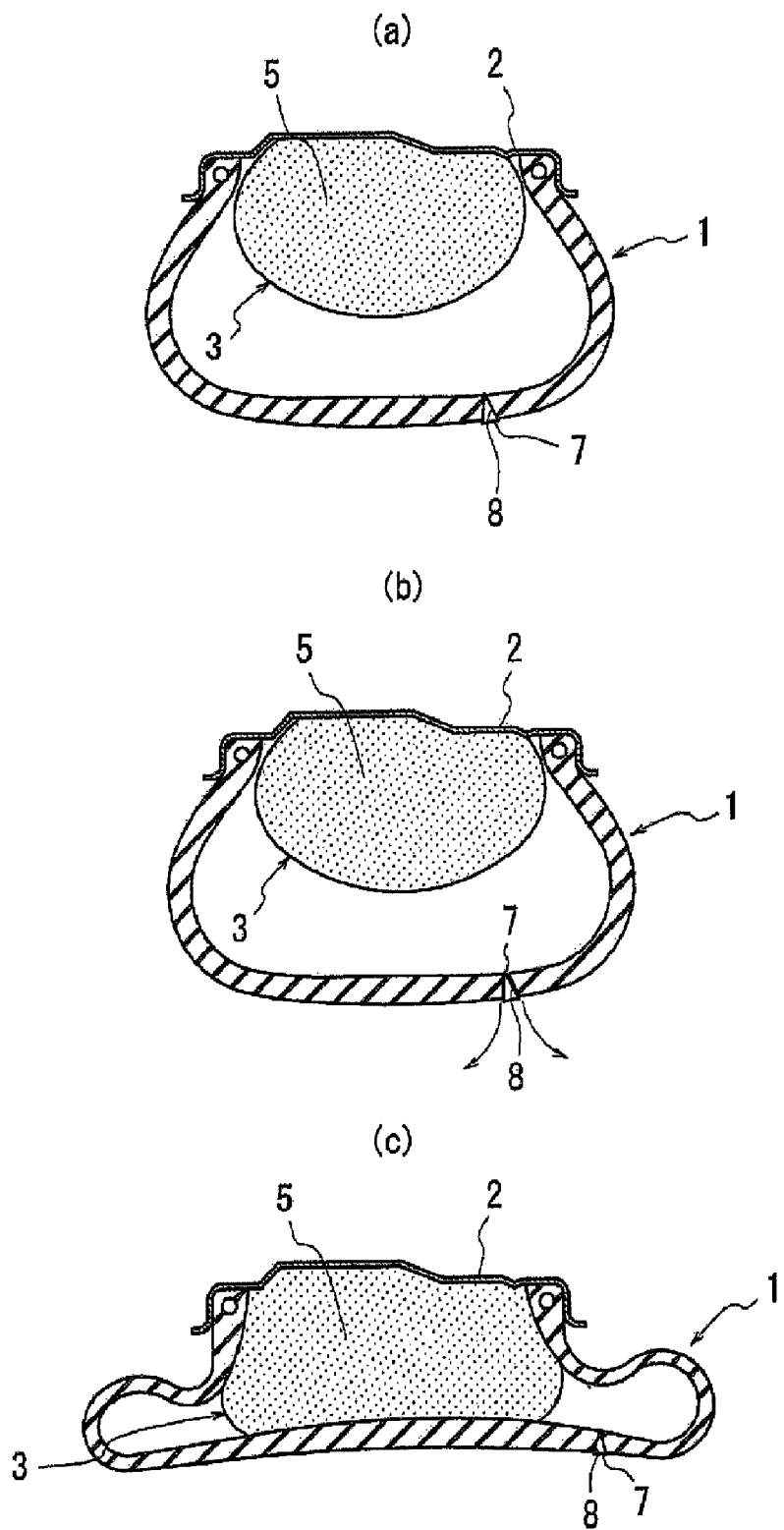
FIG. 4 is a view showing the behavior of the safety tire after the injury.

If a foreign matter 7 such as a nail or the like penetrates into the tire having in its interior the chamber 4 filled with the hollow particles 5 as shown in FIG. 4(a) and then the foreign matter 7 comes off therefrom during the traveling, air inside the tire 1 gradually leaks. Different from a splitting injury generated when the tire is used in a wasteland such as a construction site or the like, the puncture generated on a general road result from the foreign matter such as a nail, a bolt or the like penetrating the tire. In case of such a puncture, the frequency of coming off the foreign matter is very low, and in many instances, it is common that the puncture of the tire is awake after the tire with the penetrated foreign matter is left to stand for a whole day. Therefore, the leaking rate of the gas from the injury to the outside of the tire is very slow, and the tire internal pressure is gradually dropped as shown in FIGS. 4(b) and (c).

Figure 5:
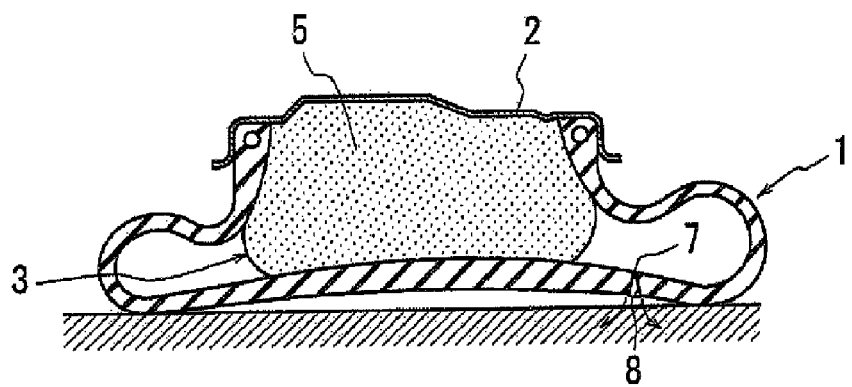
FIG. 5 is a view showing the restoring of the internal pressure in the safety tire according to the present invention.
Figure 5:
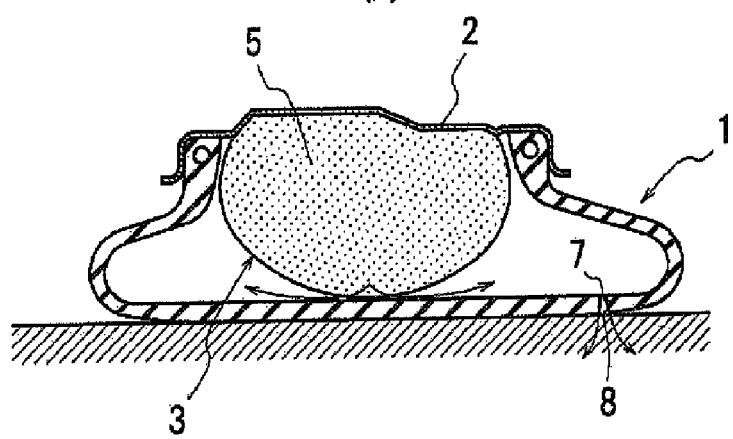
Figure 5:
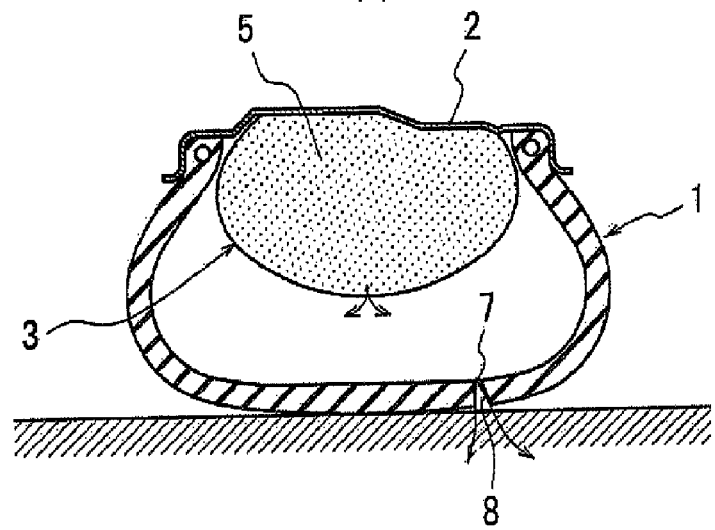

In case of continuing the traveling of the tire 1 after the dropping of the internal pressure, a deformation input is repeatedly applied to the tire as a result of continuing the traveling at a state of contacting the partition wall 3 inside the tire 1 with the inner surface of the tire 1 and applying a load to the tire as shown in FIG. 5(a). And, the hollow particles 5 in the partition wall 3 are rubbed with each other by the deformation input and self-heated through friction to raise the temperature of the hollow particles 5. As the temperature exceeds the thermal expansion starting temperature Ts2 of the hollow particles (corresponding to the glass transition point of the resin), the shell of the particle starts softening. In this state, the volume of the hollow particle expands at once because the pressure inside the hollow part in the hollow particle is high and also the temperature of the hollow particle rapidly rises.

Figure 6:
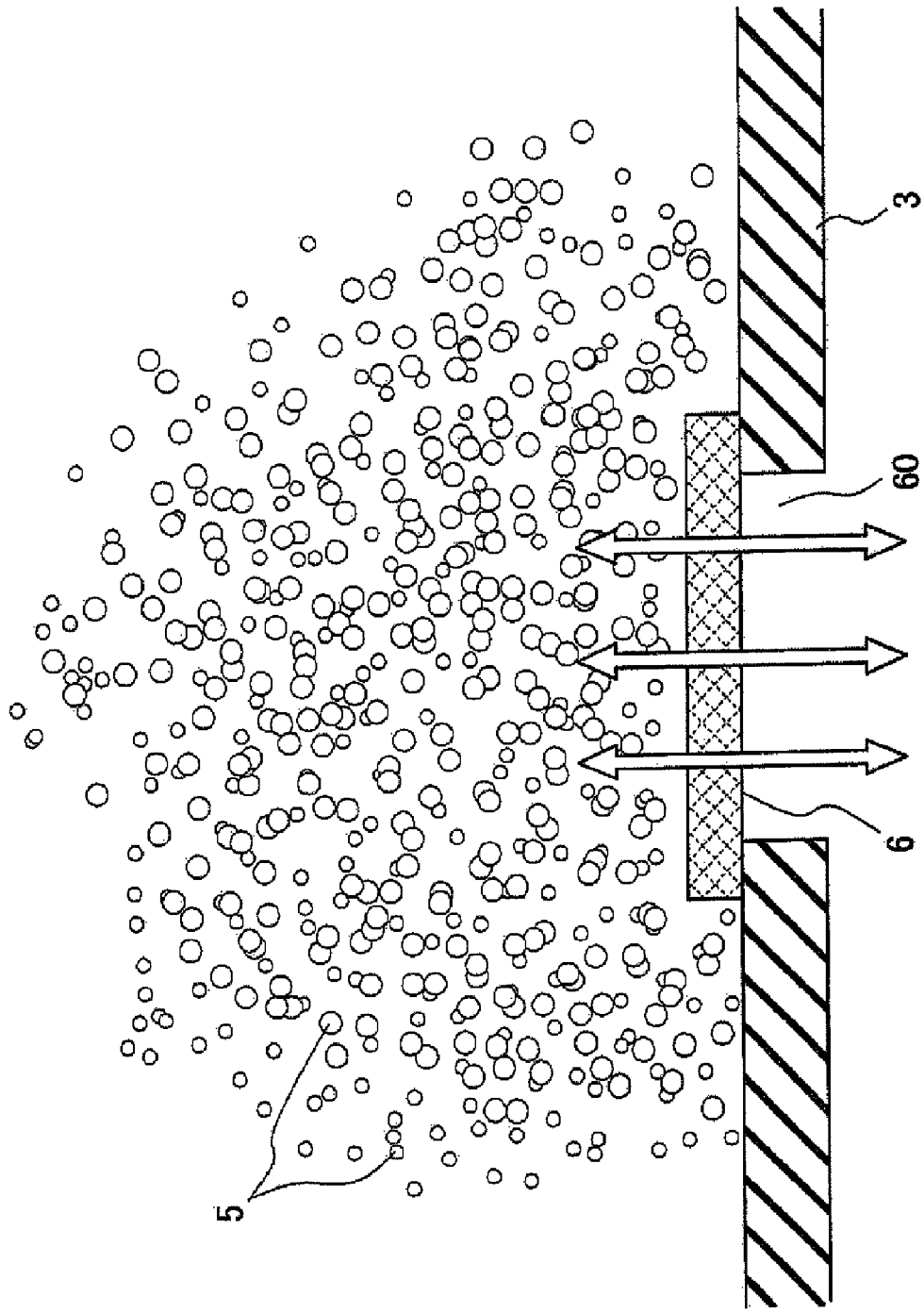
FIG. 6 is a view showing the function of the filter.

In the expanded hollow particle, the thickness of the resin constituting the continuous phase is reduced to increase the gas permeability, so that as shown in FIG. 5(b), the gas included in the hollow part of the hollow particle is emitted into the chamber 4 outside the hollow particles. As shown in FIG. 6, the partition wall 3 is provided with a filter 6 selectively passing only the gas emitted from the hollow particles 5 in the form of covering a hole 60 formed in a given location of the partition wall, so that the emitted gas is supplied through the filter 6 to the interior of the tire outside the chamber 4. That is, the internal pressure of the chamber 4 is increased by the gas emitted from the hollow particles 5, while the pressure of the interior of the tire outside the chamber 4 is decreased due to the leakage of the gas through the injured hole 8, so that the emitted gas in the chamber 4 flows into the interior of the tire having a lower pressure outside the chamber 4 through the filter 6.

The emission speed of the gas emitted from the hollow particles is faster than the leakage speed of the gas through the injured hole 8 of the tire. This is because most punctures are at the state of retaining the foreign matter in the injured part as previously mentioned, so that the leakage speed of air in the tire is very slow. Even if the foreign matter is intentionally removed, a flexible rubber layer acts to block the injured hole, so that the leakage speed of air in the tire becomes relatively slow. Therefore, it is possible to restore the tire internal pressure by a difference between the emission speed of the gas from the hollow particles and the leakage speed of air through the injured hole 8 as shown in FIG. 5(c).

Here, a phenomenon in case of using no filter will be described. As the filter is not used, the gas emitted from the hollow particles remains in the partition wall, and hence the gas develops a force of expanding the partition wall. If the partition wall is expanded at a rate higher than the volume expansion of the hollow particle, it renders into a hollow ring having a volume larger than the total bulk volume of the hollow particles. That is, extra space is created in the hollow ring, so that the hollow particles can move fluidly and freely in the partition wall. At such a state, even if a deformation input is applied to the hollow ring during the traveling with puncture, such an input cannot be transmitted to the hollow particles, and hence the restoring performance cannot be sufficiently exerted.

As the filter 6 selectively passing only the gas emitted from the hollow particles, it is preferable to use a heat-resistant filter made from at least one of glass fibers, alumina ceramic fibers, polyester fibers and nylon fibers. Because it is unavoidable that the filter is exposed to a high temperature environment owing to the restoring mechanism of the tire height by the hollow ring filled with thermally expandable hollow particles. The form of the filter may be a sintered filter, a non-woven fabric or a woven fabric. Of course, the filter is required to have a heat resistance exceeding the expansion starting temperature Ts2 of the hollow particle.

The above-mentioned emission of the gas from the hollow particles contributing to the restoring of the internal pressure is continued until the input to the partition wall disappears and the temperature of the hollow particles becomes lower than the expansion starting temperature Ts2, or until an equilibrium between the internal pressure of the hollow particle and the internal pressure of the tire is achieved so as to act the restoring of the internal pressure. Thereafter, when the emission of the gas from the hollow particles is stopped, as the leakage of the gas through the injured hole 8 of the tire proceeds, the internal pressure is reduced again to render the partition wall 3 inside the tire 1 into a state of contacting with the inner surface of the tire 1 as shown in FIG. 5(a). And, the heat generation of the hollow particles by the input to the partition wall 3 and the emission of the gas as shown in FIGS. 5(b) to (c) are repeated to attempt the restoring of the internal pressure. Through the process of repeating the reduction and restoring of the internal pressure, it is possible to safely continue the traveling over a required distance even after the puncture.

Figure 7:
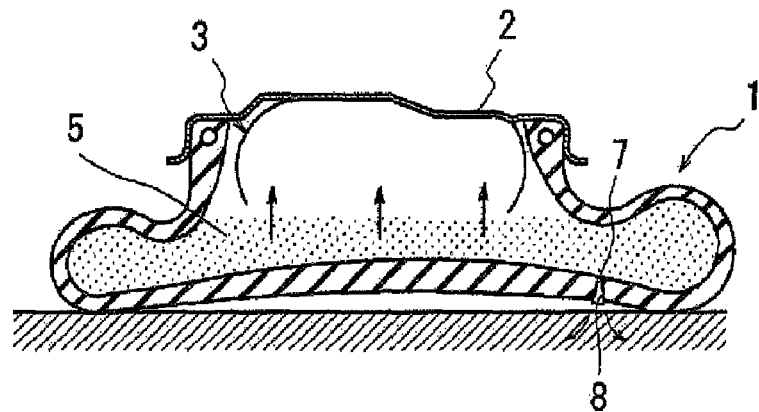
FIG. 7 is a view showing the restoring of the internal pressure in the safety tire according to the present invention.
Figure 7:
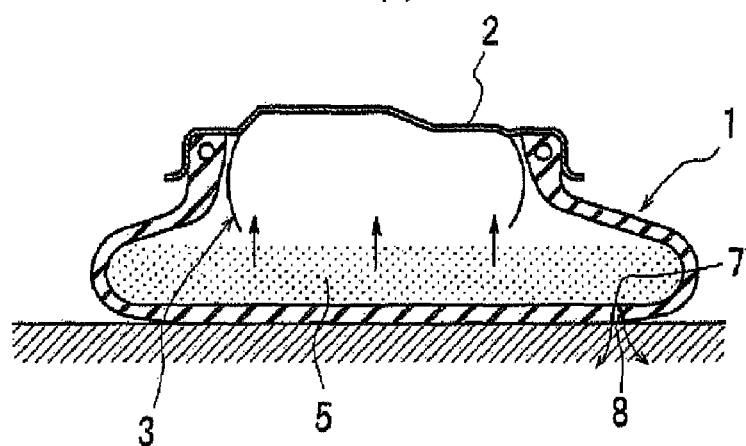
Figure 7:
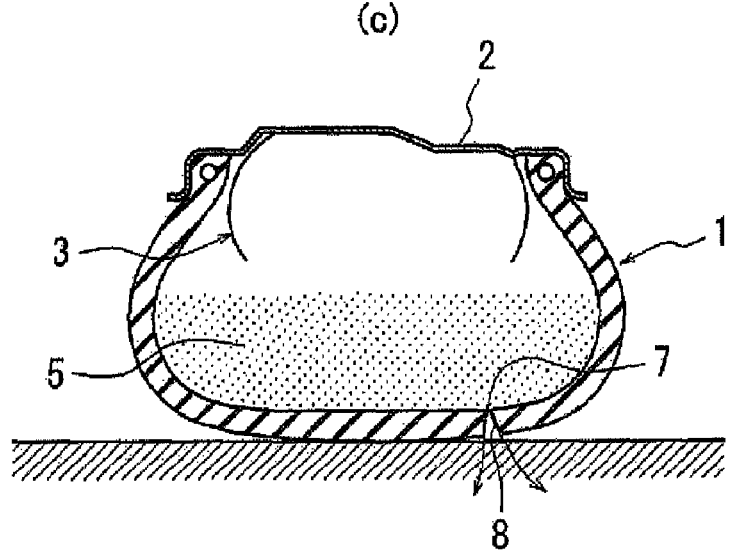

The case where the partition wall 3 made from, for example, urethane resin is broken by the large deformation input to the partition wall at a state of emitting the gas from the hollow particles will be described with reference to FIG. 7. That is, as the deforming input is applied to the partition wall 3 as shown in FIG. 7(a), the hollow particles 5 in the partition wall 3 are already heated to emit the gas, so that it is possible to restore the reduced tire internal pressure by the similar mechanism as that mentioned above as shown in FIGS. 7(b) to (c).

Also, the hollow particles 5 scattered into the interior of the tire 1 due to the breakage of the partition wall 3 block the injured hole 8 of the tire 1 and contribute to suppress the rapid reduction of the tire internal pressure.

That is, the injured hole 8 is a flow path leaking the gas in the tire chamber, and the length of the flow path substantially corresponds to the thickness of the tire. The hollow particles according to the present invention penetrate into the above-mentioned flow path at a "consolidation" state, so that the flow path can be clogged with a greater number of the hollow particles. As the pressure in the tire chamber is further increased by the above-mentioned internal pressure restoring mechanism, tension is applied to the skeleton of the tire, whereby the inner diameter of the injured hole is reduced under a squeezing action. Therefore, compression force is applied to the group of the hollow particles penetrated into the injured hole at the consolidation state squeezingly from the tire side by the increase of the pressure in the tire chamber. Since the pressure of the hollow part is high in the hollow particles according to the present invention, a reaction force resulted from the pressure of the hollow part is generated against the above compression force, whereby the degree of consolidation can be increased, and hence an injured hole having a larger inner diameter can be clogged with the hollow particles to an extent that the gas in the tire chamber hardly leaks.

Therefore, the injured hole causing the puncture can be instantly and surely clogged with the hollow particles.

Moreover, even if the partition wall 3 made of a low strength material is broken prior to the heat generation of the hollow particles 5 to release the hollow particles 5 outside the partition wall 3, the hollow particles 5 receiving the supply of the heat generated in the tire cause the volume expansion or the leakage of the included gas, so that it is possible to restore the height of the tire likewise the above case. That is, the bending amount in the punctured tire 1 is increased associated with the drop of the internal pressure to decrease the inner volume of the tire, so that the hollow particles 5 are heated by subjecting to compression and shear inputs while sandwiching between the inner surface of the tire and the inner surface of the rim, whereby the above-mentioned restoring of the internal pressure is attained.

Further, when the traveling is continued while contacting the inner surfaces of the tire with each other, mechanical breakage of the hollow particles 5 sandwiched between the contact portions is caused to promote the emission of the gas included in the particles.

Moreover, it is considered that the volume expansion of the hollow particles 5 and the emission of the gas included therein as the above phenomenon cannot be separated clearly and may be developed simultaneously and in parallel in most cases.

In order to realize the above restoring of the internal pressure through the hollow particles 5, it is preferable that the amount of the hollow particles filled in the chamber 4 is a bulk volume between 20% and 60% based on the inner volume of the tire. When the bulk volume of the hollow particles 5 is less than 20%, the total amount of the gas supplied from the hollow particles is small and the good restoring performance is not obtained but also the input applied to the hollow ring in the puncture is lacking and sufficient heat generation cannot be obtained. On the other hand, when the bulk volume exceeds 60%, the interruption in the assembling of the tire onto a wheel is large and the practicality is poor. Therefore, it is necessary to appropriately design the partition wall of the hollow ring in accordance with a tire size applied in the present invention.

Since the partition wall is constituted with the hollow ring body, it is recommended that the hollow ring body is previously filled with the hollow particles and then the filled hollow ring body is assembled into the tire.

It is important that the above-mentioned filter 6 appropriately functions in the hollow ring body. For this end, it is required to avoid the feature that when the hollow ring body is deformed associated with the bending of the tire in the drop of the internal pressure, stress due to the deformation of the hollow ring body concentrates in the attached part of the filter 6 to the hollow ring body (partition wall 3 in FIG. 6) and hence the attached part is broken to cause a gap between the filter 6 and the hollow ring body to thereby leak out the hollow particles from the hollow ring body.

Figure 8:
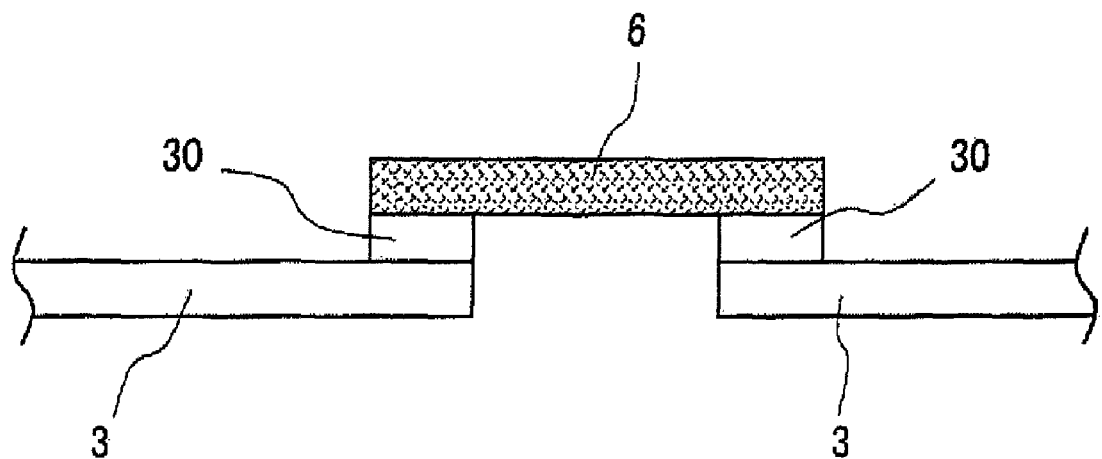
FIG. 8 is a view showing the attaching structure of the filter.
Figure 9:
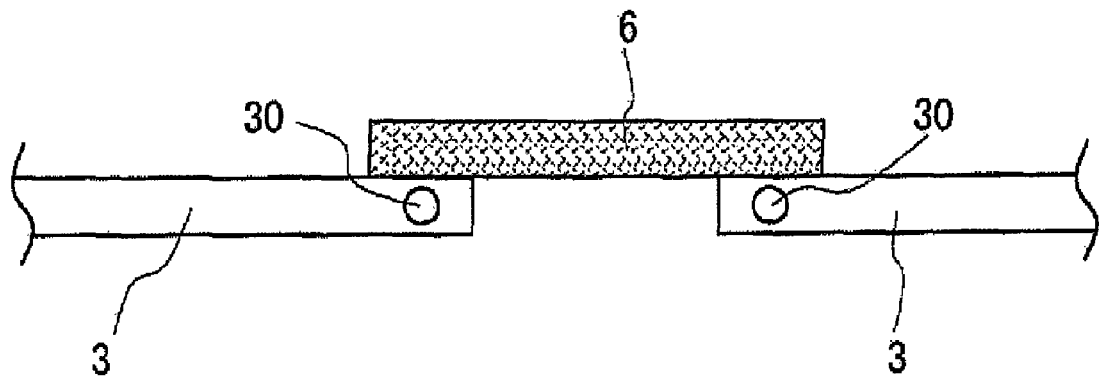
FIG. 9 is a view showing the attaching structure of the filter.

As shown in FIGS. 8 and 9, therefore, there may be taken a structure that strain is not concentrated in the attached part between the filter 6 and the hollow ring body (partition wall 3) by attaching the filter 6 to the hollow ring body (partition wall 3) through a stiff structure 30 of, for example, a resin having a high material stiffness or a metal, or with a stiff structure embedded in the hollow ring body.

When a resin ring is adopted as the stiff structure 30, it is preferable to use the same material as in the partition wall. Because, when the same resin is used, the joining through thermal joining is easy. For example, a thermoplastic polyurethane material is more preferable because, in addition to the thermal joining to the partition wall 3, there is an advantage that material stiffness can be arbitrarily set. On the other hand, when using a resin having a poor affinity to the partition wall or a metal, it should be particularly noted that it is required to ensure the adhesiveness to the partition wall 3.

In any cases, it is obvious that the filter should be attached through a member having a stiffness higher than that of the partition wall 3.

Figure 10:
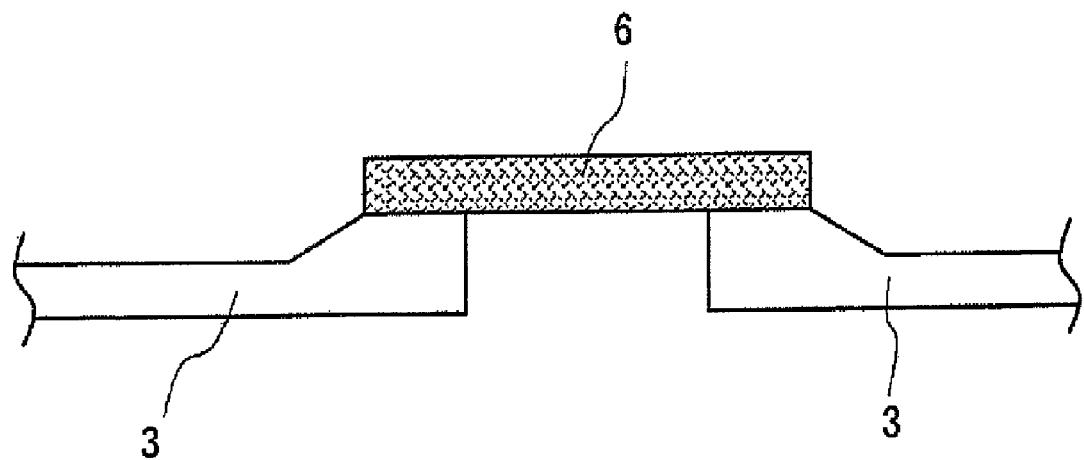
FIG. 10 is a view showing the attaching structure of the filter.

On the other hand, there is a method of obtaining a structure that strain does not concentrate in the attached part between the filter and the partition wall 3 without using different materials as shown in FIG. 10. For example, the thickness of a portion of the partition wall that is attached to the filter is made thicker, and as a result, the stiffness of such a portion is enhanced, whereby the strain concentration to the filter can be avoided.

Figure 11:
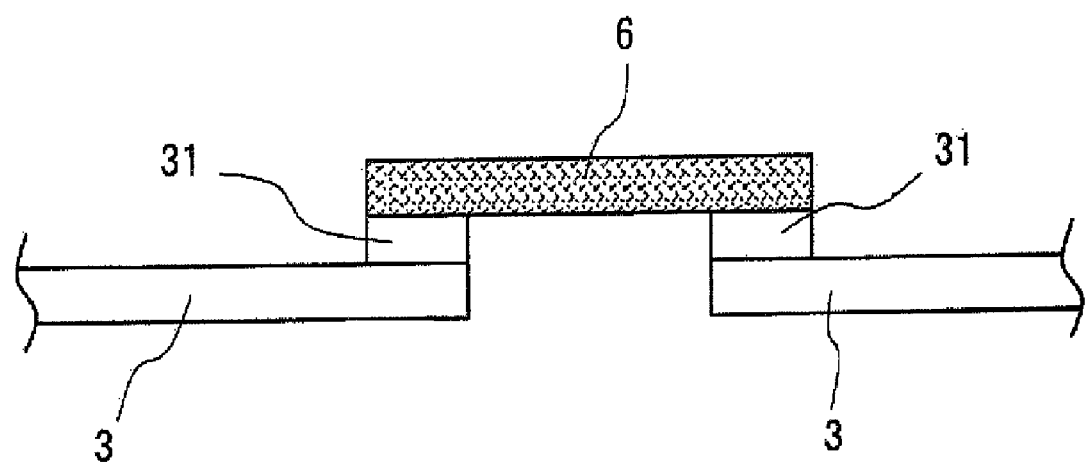
FIG. 11 is a view showing the attaching structure of the filter.

Similarly, as shown in FIG. 11, it is effective to take a structure that strain in the attached part between the filter 6 and the hollow ring body (partition wall 3) is mitigated by attaching the filter 6 to the hollow ring body (partition wall 3) through a flexible structure 31 made from, for example, a resin having a low material stiffness or the like.

As mentioned above, when using the thermoplastic polyurethane material, the material stiffness can be arbitrarily set, so that the use of the flexible structure is also easy. However, the lowering of the stiffness generally tends to deteriorate the heat resistance, so that it is important to select material in consideration of the use environment of the present invention.

From the viewpoint of such a strain mitigation, a stretchable material, for example, a material ensuring the stretchability in the manufacturing process regardless of woven and nonwoven fabrics may be used in the filter 6 itself. In addition, use may be made of a filter having a stretchability provided by an accordion forming process and a spongy filter having open cells.

Figure 12:
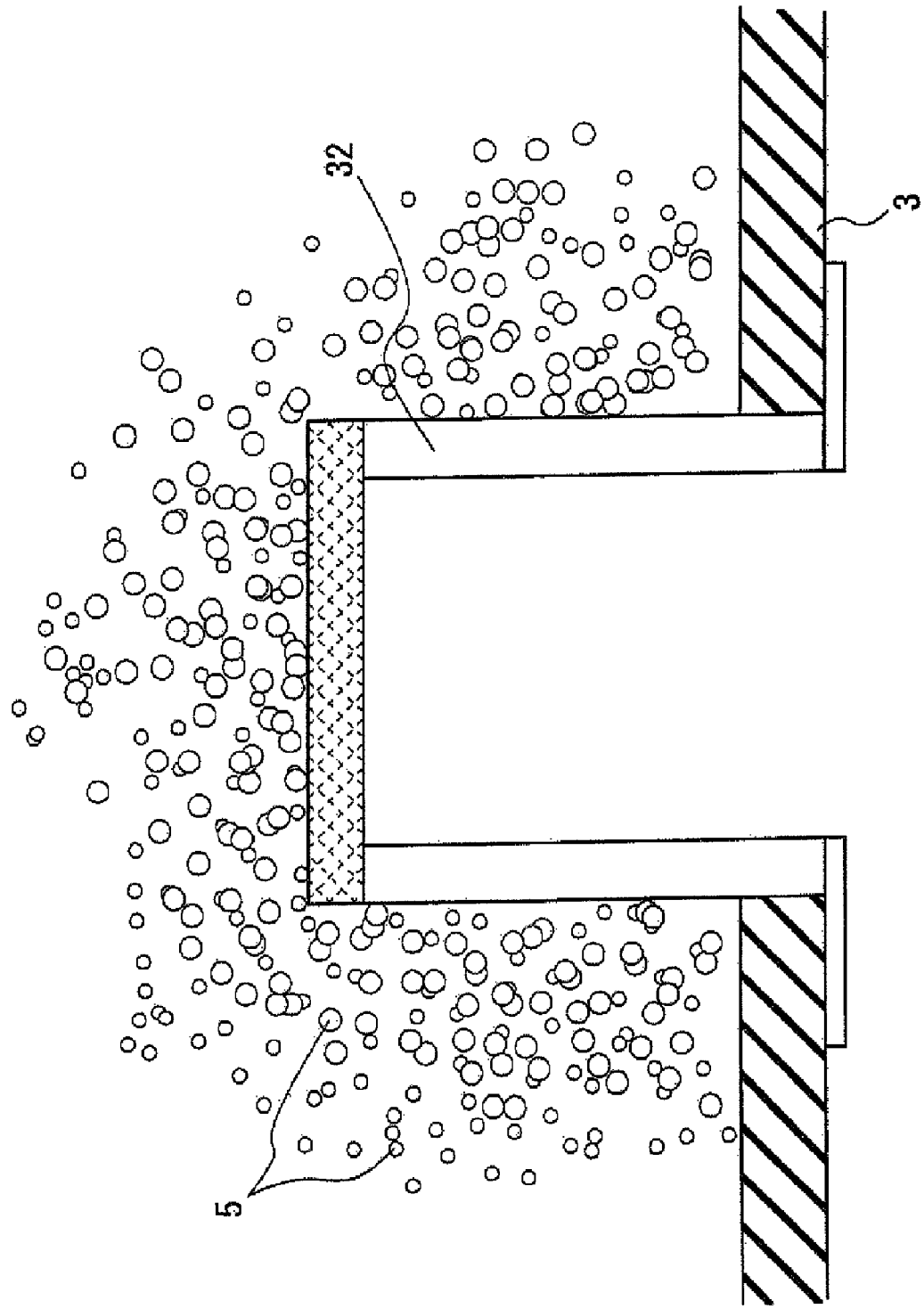
FIG. 12a is a view showing the attaching structure of the filter.
FIG. 12b is a view showing the attaching structure of the filter.

Alternatively, as shown in FIGS. 12(*a*) and (*b*), if the partition wall 3 and the filter 6 are connected through a tubular member 32 extending into an inside of the hollow ring body, the deformation of the partition wall 3 does not arrive at the filter 6, so that the similar effect can be obtained. Moreover, FIG. 12(*a*) is an example that a base of the tubular member 32 is adhered to the inner wall of the hollow ring body, and FIG. 12(*b*) is an example that the base of the tubular member 32 is adhered to the outer wall of the hollow ring body.

EXAMPLES

A tire/rim assembly formed by mounting a tire for a passenger car having a size of 175/70R13 onto a rim of 5.5 J×13 is prepared according to the following various specifications. In an example according to the present invention, a given amount of hollow particles is previously filled into a hollow ring body to form a core for a safety tire, and the core is disposed along the rim inside the tire in the mounting of the tire onto the rim. In Invention Example 1, a hollow ring-shaped partition wall is made of a thermoplastic polyurethane having a thickness of 2 mm, while a thermoplastic polyurethane having a thickness of 4 mm is used in Invention Example 2. In each partition wall are disposed four glass fiber filters at equal intervals on the circumference. In Conventional Example is used a usual tire/rim assembly. As Comparative Example, there is prepared a tire having the same construction as in Invention Example 1 except that the filter is not disposed in the partition wall.

With respect to each tire, a nail having a diameter of 5.3 mm is inserted into the tire, and after the confirmation that the nail surely penetrates the inner surface of the tire, the nail is removed to form an injured tire. The properties of the partition wall (thermoplastic polyurethane) and the filter used in Invention Examples are shown in Table 1.

TABLE 1

| | | Invention Example 1 | Invention Example 2 |
|---|---|---|---|
| Partition Wall | Strength at break (MPa) | 43.0 | 41.2 |
| | Elongation at break (%) | 308 | 688 |
| | Softening point (° C.) | 151 | 93 |
| | Glass transition point (° C.) | −4 | −45 |
| | Specific gravity (g/cc) | 1.22 | 1.16 |
| | Hardness (ShoreA) | 98A | 75A |
| Filter | Material | Glass Fiber | |
| | Mesh size (μm) | 7-10 | |

In addition, the properties of the hollow particle used in tires of Invention Examples and Comparative Example are as follows. The bulk volume of the hollow particles used in each of the test tires is 8 liters.

Note:

Resin composition of a continuous phase: acrylonitrile/methyl methacrylate copolymer Gas included in the hollow part: HFE-7000 ($C_3F_7OCH_3$)

Average particle diameter: 96 μm

Expansion starting temperature: 92° C.

True specific gravity: 0.031 g/cc

Thickness of a continuous phase: 0.3 μm

Next, each of the test tires is mounted on a front-wheel driven passenger car having a class of 1000 cc, and a load corresponding to 4 persons is applied to perform the following evaluation.

That is, the test tire is mounted on a left front wheel of the test vehicle and the traveling is started from a state that the internal pressure of the tire is completely emitted. Normal tires are mounted on the rest of three wheels. The vehicle is run on a test course at a speed of 80 km/h for 1 hour, during which the tire internal pressure and the height from the ground to the rim flange (hereinafter referred to as tire height) are measured to compare Invention Examples and Conventional Example. The evaluation results are shown in Table 2.

TABLE 2

| Time | Conventional Example | | Invention Example 1 | | Invention Example 2 | | Comparative Example | |
|---|---|---|---|---|---|---|---|---|
| [min.] | [kPa] | [mm] | [kPa] | [mm] | [kPa] | [mm] | [kPa] | [mm] |
| 0 | 0.0 | 15.5 | 0.0 | 25.0 | 0.0 | 23.0 | 0.0 | 25.0 |
| 1 | 11.3 | 19.0 | 12.6 | 22.0 | 7.1 | 18.5 | 13.1 | 19.0 |
| 2 | 0.0 | 15.0 | 16.9 | 20.5 | 15.6 | 20.5 | 14.5 | 22.0 |
| 4 | traveling impossible | | 22.1 | 21.5 | 29.2 | 23.0 | 15.6 | 22.0 |
| 6 | | | 26.0 | 22.5 | 41.3 | 22.0 | 16.2 | 23.5 |
| 8 | | | 29.6 | 23.5 | 47.9 | 35.0 | 15.9 | 24.0 |
| 10 | | | 32.2 | 26.0 | 51.3 | 38.5 | 15.7 | 24.5 |
| 12 | | | 34.6 | 28.0 | 53.8 | 39.5 | 16.2 | 25.0 |
| 14 | | | 36.7 | 28.5 | 55.5 | 40.5 | 16.5 | 24.5 |
| 16 | | | 38.7 | 29.5 | 56.5 | 41.5 | 0.0 | 15.5 |
| 18 | | | 40.1 | 31.5 | 57.4 | 42.0 | traveling impossible | |
| 20 | | | 41.1 | 32.5 | 58.0 | 43.0 | | |
| 25 | | | 42.5 | 33.0 | 58.9 | 44.0 | | |
| 30 | | | 42.3 | 33.0 | 58.9 | 44.0 | | |
| 35 | | | 43.1 | 33.5 | 58.6 | 44.0 | | |
| 40 | | | 41.8 | 32.5 | 58.3 | 43.5 | | |
| 45 | | | 42.6 | 33.0 | 58.4 | 43.5 | | |

TABLE 2-continued

| Time | Conventional Example | | Invention Example 1 | | Invention Example 2 | | Comparative Example | |
|---|---|---|---|---|---|---|---|---|
| [min.] | [kPa] | [mm] | [kPa] | [mm] | [kPa] | [mm] | [kPa] | [mm] |
| 50 | | | 42.6 | 33.0 | 58.4 | 43.5 | | |
| 55 | | | 43.1 | 33.5 | 58.3 | 43.5 | | |
| 60 | | | 41.3 | 33.0 | 58.4 | 43.5 | | |

As shown in Table 2, in Conventional Example, the sidewall portion of the tire breaks in 67 seconds after the traveling is started and the traveling becomes impossible. In Comparative Example, the sidewall portion of the tire breaks in 15 minutes and 22 seconds after the traveling is started and the traveling becomes impossible. In Comparative Example, since there is no filter as stated above, the input to the hollow particles is early relaxed and the tire height cannot be sufficiently restored, and hence the traveling is continued while rubbing the sidewall portion on the road surface and sufficient traveling distance cannot be obtained.

On the other hand, as the hollow ring bodies in Invention Examples are taken out from the tires after the traveling, it is revealed in Invention Example 1 that the hollow ring-shaped partition wall is broken and the tire height is restored by the pressure of the gas emitted from the hollow particles released outside the partition wall.

In Invention Example 2, the hollow ring-shaped partition wall is not broken, and the tire height is restored by the pressure of the gas leaked out from the hollow particles in the hollow ring body.

In each Invention Example, the gradual lowering of the restored tire height is based on the fact that the leakage of the gas through the injured hole outside the tire gradually progresses.

The invention claimed is:

1. A hollow ring body in combination with thermally expandable hollow particles, the hollow ring body used inside a tire/approved rim assembly constructed by assembling the tire onto the approved rim, characterized in that the hollow ring body is filled with the thermally expandable hollow particles each consisting of a continuous phase of a resin and a closed cell(s) and is provided with a filter positioned inside the hollow ring body so as to cover an opening in the hollow ring body, the filter selectively passing, from the hollow ring body, only a gas emitted when the hollow particles are thermally expanded.

2. A hollow ring body according to claim 1, wherein the filter is attached to the hollow ring body through a stiff structure.

3. A hollow ring body according to claim 1, wherein the filter is attached to the hollow ring body through a flexible structure.

4. A hollow ring body according to claim 1, wherein the filter is attached to the hollow ring body through a tubular member that extends inwardly from the hollow ring body, such that the tubular member extends into a portion of the hollow ring body that is filled with the thermally expandable hollow particles.

5. A hollow ring body according to claim 1, wherein the filter is a heat-resistant filter made from at least one of glass fibers, alumina-based ceramic fibers, polyester fibers and nylon fibers.

6. A safety tire comprising a tire/approved rim assembly constructed by assembling the tire onto the approved rim, a hollow ring-shaped partition wall disposed inside the assembly to define a chamber extending in a circumferential direction along the rim, and thermally expandable hollow particles filled in the chamber, each particle comprising a continuous phase of a resin and a closed cell, wherein, the partition wall has an opening and a filter positioned inside the partition wall covers the opening, the filter selectively passing, from the chamber, only a gas emitted when the hollow particles are thermally expanded.

7. A safety tire according to claim 6, wherein the partition wall is made from a urethane resin.

8. A safety tire according to claim 6, wherein the filter is a heat-resistant filter made from at least one of glass fibers, alumina-based ceramic fibers, polyester fibers and nylon fibers.

9. A safety tire according to claim 6, wherein the filter is attached to the partition wall through a stiff structure.

10. A safety tire according to claim 6, wherein the filter is attached to the partition wall through a flexible structure.

11. A safety tire according to claim 6, wherein the filter is attached to the partition wall through a tubular member that extends inwardly from the partition wall, such that the tubular member extends into a portion of the partition wall that is filled with the thermally expandable hollow particles.

12. A hollow ring body in combination with thermally expandable hollow particles, the hollow ring body used inside a tire/approved rim assembly constructed by assembling the tire onto the approved rim, characterized in that the hollow ring body is filled with the thermally expandable hollow particles each comprising a continuous phase of a resin and a closed cell(s) and is provided with a filter selectively passing only a gas emitted when the hollow particles are thermally expanded, wherein the filter is attached to the hollow ring body through a tubular member that extends inwardly from the hollow ring body, such that the tubular member extends into a portion of the hollow ring body that is filled with the thermally expandable hollow particles.

13. A safety tire comprising a tire/approved rim assembly constructed by assembling the tire onto the approved rim, a hollow ring-shaped partition wall disposed inside the assembly to define a chamber extending in a circumferential direction along the rim, and thermally expandable hollow particles filled in the chamber, each particle comprising a continuous phase of a resin and a closed cell, wherein, the partition wall is provided with a filter selectively passing only a gas emitted when the hollow particles are thermally expanded, and wherein, the filter is attached to the partition wall through a tubular member that extends inwardly from the partition wall, such that the tubular member extends into a portion of the partition wall that is filled with the thermally expandable hollow particles.

* * * * *